(12) United States Patent
Huang et al.

(10) Patent No.: US 8,134,554 B1
(45) Date of Patent: Mar. 13, 2012

(54) METHOD AND APPARATUS FOR SPATIALLY MAPPING THREE-DIMENSIONAL OPTICAL COHERENCE TOMOGRAPHY DATA WITH TWO-DIMENSIONAL IMAGES

(75) Inventors: Yijun Huang, Pleasantville, NY (US); Alexandre Kotchkin, Ridgewood, NJ (US); Tetsuyoshi Royama, Montvale, NJ (US)

(73) Assignee: Topcon Medical Systems, Inc., Oakland, NJ (US)

( * ) Notice: Subject to any disclaimer, the term of this patent is extended or adjusted under 35 U.S.C. 154(b) by 1221 days.

(21) Appl. No.: 11/800,186

(22) Filed: May 4, 2007

(51) Int. Cl.
*G06T 17/00* (2006.01)

(52) U.S. Cl. ........................................................ 345/424

(58) Field of Classification Search .................. None
See application file for complete search history.

(56) References Cited

U.S. PATENT DOCUMENTS

| | | | |
|---|---|---|---|
| 5,491,524 A | 2/1996 | Hellmuth et al. | |
| 5,835,617 A * | 11/1998 | Ohta et al. | 382/131 |
| 5,994,690 A | 11/1999 | Kulkarni et al. | |
| 6,006,128 A | 12/1999 | Izatt et al. | |
| 6,293,674 B1 | 9/2001 | Huang et al. | |
| 6,485,413 B1 | 11/2002 | Boppart et al. | |
| 6,564,089 B2 | 5/2003 | Izatt et al. | |
| 6,615,072 B1 | 9/2003 | Izatt et al. | |
| 6,657,727 B1 | 12/2003 | Izatt et al. | |
| 6,735,463 B2 | 5/2004 | Izatt et al. | |
| 6,763,259 B1 | 7/2004 | Hauger et al. | |
| 6,769,769 B2 | 8/2004 | Podoleanu et al. | |
| 6,775,007 B2 | 8/2004 | Izatt et al. | |
| 6,785,410 B2 * | 8/2004 | Vining et al. | 382/128 |
| 6,813,050 B2 | 11/2004 | Chen et al. | |
| 7,006,232 B2 | 2/2006 | Rollins et al. | |
| 7,016,048 B2 | 3/2006 | Chen et al. | |
| 7,061,622 B2 | 6/2006 | Rollins et al. | |
| 7,072,047 B2 | 7/2006 | Westphal et al. | |
| 7,075,658 B2 | 7/2006 | Izatt et al. | |
| 7,088,454 B2 | 8/2006 | Chang et al. | |
| 7,102,756 B2 | 9/2006 | Izatt et al. | |
| 7,355,716 B2 * | 4/2008 | de Boer et al. | 356/479 |
| 7,474,407 B2 * | 1/2009 | Gutin | 356/479 |
| 2002/0049375 A1 * | 4/2002 | Strommer et al. | 600/407 |
| 2005/0094099 A1 | 5/2005 | Newman et al. | |
| 2005/0185192 A1 * | 8/2005 | Kim et al. | 356/497 |
| 2006/0276709 A1 * | 12/2006 | Khamene et al. | 600/416 |
| 2007/0115481 A1 * | 5/2007 | Toth et al. | 356/511 |

OTHER PUBLICATIONS

Carl Zeiss Stratus OCT Product Brochure, http://www.meditec.zeiss.com/c125679e0051c774/Contents-Frame/b414083c6e73e762882570150064b131. Downloaded May 4, 2007.
Yamanari, M et al., Fiber-Based Polarization-Sensitive Fourier Domain Optical Coherence Tomography Using B-Scan-Oriented Polarization Modulation Method, vol. 14, No. 14, Optics Express, Jul. 10, 2006, pp. 6502-6515.

* cited by examiner

*Primary Examiner* — Said Broome
(74) *Attorney, Agent, or Firm* — Wolff & Samson PC

(57) ABSTRACT

Voxel data from a three-dimensional optical coherence tomography (3-D OCT) scan of a retina and pixel data from a two-dimensional (2-D) fundus image are spatially mapped. A 2-D composite image generated from the 3-D OCT data is spatially mapped to a fundus image using spatial indicia common to both images. The 3-D OCT data is then spatially mapped to the fundus image. An image processing system generates cross-correlated graphical representations of 3-D OCT data, subsets of 3-D OCT data, and a fundus image.

26 Claims, 10 Drawing Sheets

METHOD AND APPARATUS FOR SPATIALLY MAPPING THREE-DIMENSIONAL OPTICAL COHERENCE TOMOGRAPHY DATA WITH TWO-DIMENSIONAL IMAGES

BACKGROUND OF THE INVENTION

The present invention relates generally to medical imaging, and more particularly to opthalmic imaging.

Diagnostics for eye disorders typically include a detailed opthalmic examination of the retina. For initial examination, an eye doctor will view the retina through an opthalmoscope. For a permanent record, the retina is typically photographed with a fundus camera. A fundus photograph directly records various features of the retina, such as blood vessels and lesions. The imaging capabilities of fundus photography may be enhanced by supplementary techniques. A high-contrast image of retinal blood vessels, for example, may be photographed after the injection of a fluorescent dye into the bloodstream. The resulting image is referred to as a fluorescein angiogram (FA).

Fundus photography is not limited solely to images of the retina. The ocular fundus (the inner lining of the eye) comprises the sensory retina, the retinal pigment epithelium, Bruch's membrane, and the choroid. Imaging of the choroid, a layer deeper than the retina, for example, may be produced by injecting indocyanine green dye, which fluoresces in the infrared spectrum, into the bloodstream. The resulting image, which may be captured on infrared film, is referred to as an indocyanine green chorioangiogram (ICG). Fundus images in both the visible and infrared spectrum may also be captured by digital imaging systems instead of photographic film.

More sophisticated techniques have recently been developed for diagnostics of the eye. One such technique is three-dimensional optical coherence tomography (3-D OCT). In this technique, a light beam is directed onto the retina. Part of the beam is back-reflected. Interferometric analysis of the back-reflected light yields information on the structure of the retina. By varying optical parameters of the light probe, features at different depths below the surface of the retina may be probed. With this process, an image of a cross-section of the retina may be generated by scanning the optical probe along a line on the retina. By rastering the optical probe across the surface of the retina, a series of cross-sectional images may be produced. The series of cross-sectional images characterize the 3-D structure of the retina.

Cross-sectional images yield diagnostic information complementary to that provided by fundus images. A more comprehensive analysis of the retina may be provided by analyzing a series of cross-sections of a specific feature, such as a lesion or blood vessel. Accurate alignment of 3-D OCT cross-sections with a feature on a fundus image has proven to be difficult. What is needed, for example, is a high-resolution technique for spatially mapping 3-D OCT measurements with features on a fundus image.

BRIEF SUMMARY OF THE INVENTION

Voxel data associated with a 3-D OCT scan and pixel data associated with a two-dimensional image are spatially mapped. For example, a 3-D OCT scan of a retina may be spatially mapped to a fundus image. In one embodiment of the invention, a two-dimensional (2-D) composite image is generated from a 3-D OCT scan by projecting the voxels onto a plane parallel to the plane of the fundus image. Spatial indicia, such as graphical representations of blood vessels or lesions, are identified in the fundus image. Corresponding spatial indicia are identified in the 2-D composite image. The 2-D composite image is spatially mapped to the fundus image by spatially mapping spatial indicia in the 2-D composite image to corresponding spatial indicia in the fundus image.

In one embodiment of the invention, the 2-D composite image and the fundus image are processed by an image processing system and displayed on a monitor. A user views the two images and identifies corresponding spatial indicia in the two images. The user operates an input device to manipulate at least one of the images to superimpose at least one spatial indicium in the 2-D composite image onto the corresponding spatial indicium in the fundus image. The image processing system analyzes the images to generate coordinates of the spatial indicia in the 2-D composite image and in the fundus image. The image processing system spatially maps the coordinates of the spatial indicia in the 2-D composite image to the coordinates of the corresponding spatial indicia in the fundus image. In the region which is common to the 2-D composite image and the fundus image, the image processing system maps all points in the 2-D composite image to corresponding points in the fundus image.

In another embodiment of the invention, the two images are displayed on a monitor, and the images are kept separate and stationary. A user views the two images and operates a user input device to position a cursor on a spatial indicium in the 2-D composite image. The user actuates the user input device to transmit control signals to enter the coordinates of the spatial indicium into an image processing system. The user then positions the cursor on the corresponding spatial indicium in the fundus image. The user actuates the user input device to transmit control signals to enter the coordinates of the spatial indicium into the image processing system. The image processing system spatially maps the coordinates of the spatial indicia in the 2-D composite image to the coordinates of the corresponding spatial indicia in the fundus image. In the region which is common to the 2-D composite image and the fundus image, the image processing system maps all points in the 2-D composite image to corresponding points in the secondary 2-D image.

In another embodiment of the invention, voxel data associated with a 3-D OCT scan and pixel data associated with a two-dimensional image are entered into an image processing system. Image recognition and processing software in the image processing system spatially maps the 2-D composite image to the fundus image. In the region which is common to the 2-D composite image and the fundus image, the image processing system maps all points in the 2-D composite image to corresponding points in the secondary 2-D image.

Once the 2-D composite image has been spatially mapped to the fundus image, the set or subsets of the voxel data may be cross-correlated with positions in the fundus image. In one embodiment of the invention, the set or subsets of the voxel data and the fundus image are processed by an image processing system and displayed on a monitor. A user views the fundus image, and operates a user input device to position a cursor over a position in the fundus image. The user actuates the user input device to transmit control signals to generate graphical representations of the set or subsets of voxel data spatially mapped to the position in the fundus image. A user may also view an image generated by the set or subsets of the voxel data, and operate a user input device to position a cursor over a position in the image. The user actuates the user input device to transmit control signals to generate the corresponding fundus image.

These and other advantages of the invention will be apparent to those of ordinary skill in the art by reference to the following detailed description and the accompanying drawings.

DETAILED DESCRIPTION

A three-dimensional optical coherence tomography (3-D OCT) scan measures back-reflected optical signals from a 3-D matrix of discrete points in a retina. Herein, "3-D OCT data" refers to a set of signal intensities measured from a 3-D matrix of discrete points in a retina, and "signal intensity" refers to back-reflected optical signal intensity. A 3-D graphical representation of 3-D OCT data comprises a 3-D matrix of voxels, wherein a voxel corresponds to a discrete point in the retina, and the luminance of a voxel is proportional to the signal intensity measured at that point. In an embodiment of the invention, 3-D OCT data may be spatially mapped to a fundus image by first generating a two-dimensional (2-D) composite image from the 3-D OCT data, and then spatially mapping the 2-D composite image to the fundus image.

In one embodiment of the invention, a fundus image and a 2-D composite image may be both displayed on a monitor. The 2-D composite image is manipulated until characteristic features such as blood vessels and lesions present in the 2-D composite image are superimposed on corresponding characteristic features present in the fundus image. Values of 3-D OCT data corresponding to characteristic features in the fundus image may then be analyzed. Graphical representations of the set or subsets of the 3-D OCT data may be cross-correlated with a characteristic feature in the fundus image. Subsets of the 3-D OCT data may include, for example, signal intensity as a function of depth below the surface of the retina at a specific point on the surface of the retina, or signal intensity as a function of position on a cross-sectional plane perpendicular to the surface of the retina. One subset of the 3-D OCT data may also be cross-correlated with a second subset of 3-D OCT data.

In one embodiment of the invention, a 2-D composite image and a fundus image may be processed by a computer, and the images may be displayed on a computer monitor. A user input device, such as a mouse, may be used to position a cursor over a specific point in the display of the fundus image, and graphical displays of the corresponding set or subsets of the 3-D OCT data may be generated as a response to control signals from the user input device. Control signals may be issued, for example, by clicking the mouse. Similarly, a cursor may be positioned over a specific point in the graphical display of a set or subset of 3-D OCT data, and the corresponding fundus image may be generated as a response to control signals from the user input device.

Figure 1A:
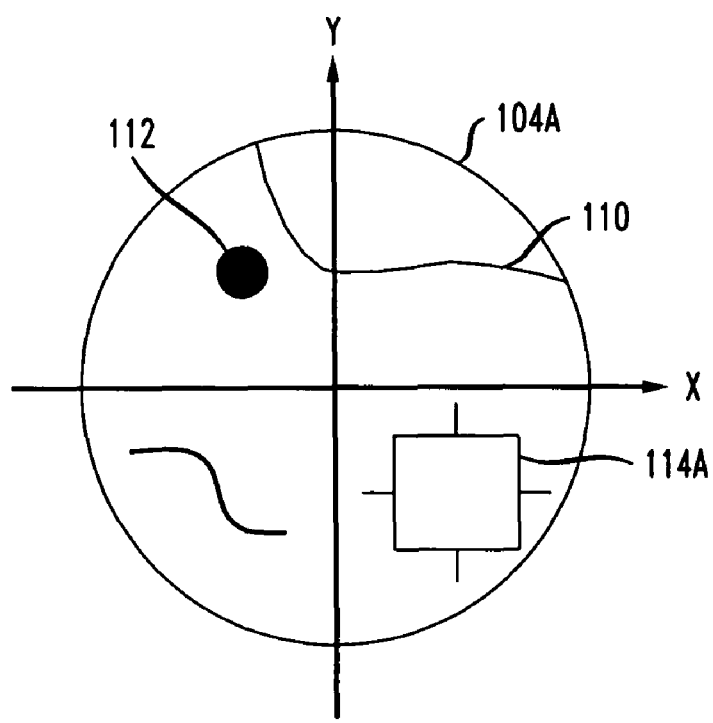
FIG. 1A is a schematic of a fundus image.
Figure 1B:
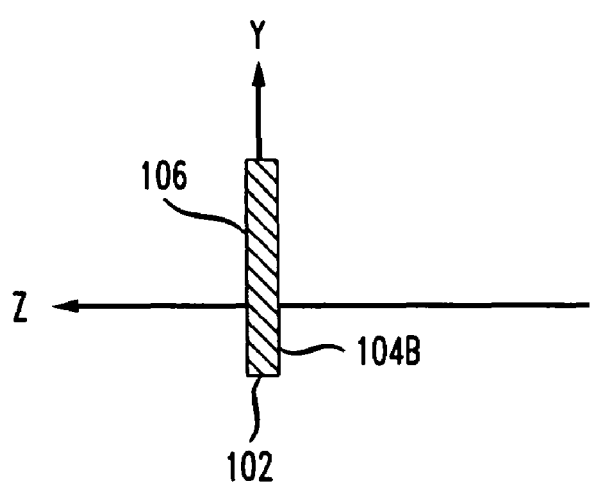
FIG. 1B is a schematic of a cross-section of a retina.

The steps for generating 3-D OCT data, generating a 2-D composite image, and spatially mapping 3-D OCT data to a fundus image will be discussed below. First, however, the coordinate systems for the 3-D OCT data and a fundus image are specified here. FIG. 1A is a graphical representation of a front surface 104A of a retina, and FIG. 1B is a graphical representation of a cross-section 102 of a retina. A front surface, for example, may be that which is viewed by an observer through an opthalmoscope. A front surface may also, for example, be that which is photographed by a fundus camera. Although a retina is a curved structure, it may be approximated by a flat structure. The plane of the front surface 104A is represented by the x-y plane. The z-axis (also referred to as the longitudinal axis) is perpendicular to the x-y plane. In FIG. 1B, cross-section 102 represents a cross-section of a flat retinal structure which approximates a curved retinal structure. The plane of cross-section 102 is represented by the y-z plane. Front surface 104B corresponds to the front surface 104A. The positive direction of z runs from the front surface 104B to the rear surface 106, with z=0 defined at the front surface 104B. The z-coordinate indicates the depth of a layer below the front surface 104B. The front surface 104A corresponds to the front surface 104B viewed along the +z direction.

To simplify the terminology, hereinafter, the graphical representation of front surface 104A will be referred to as "fundus image 104A" The lateral coordinates (x,y) of a point are designated with respect to a coordinate system in a fundus image, or other secondary 2-D image. Secondary 2-D images are discussed below. Herein, the coordinates (X,Y) of a point are designated with respect to a coordinate system in a 3-D OCT scan. The correspondence between (x,y) and (X,Y) are discussed below. The longitudinal coordinate Z is also designated with respect to the coordinate system in a 3-D OCT scan. In one embodiment of a coordinate system, the origin Z=0 is in front of the plane of the retina, such that the Z coordinate of the front surface 104B of the retina is an offset value $\Delta Z$. Strictly, then, the Z-coordinate $Z_D$ of a point at a depth D below the surface of the retina is $Z_D = D + \Delta Z$. To simplify the terminology in the discussions below, the Z-coordinate $Z_D$ will be referred to as the depth Z.

Graphical representations of various characteristic features are shown in the fundus image 104A. For example, characteristic feature 110 is a graphical representation of a blood vessel, and characteristic feature 112 is a graphical representation of a lesion. To simplify the terminology, hereinafter, characteristic feature 110 will be referred to simply as a "blood vessel," instead of a graphical representation of a blood vessel. Similarly, characteristic feature 112 will be referred to simply as a "lesion." As discussed below, these features may be used to define a correspondence between (x,y) and (X,Y).

Figure 1C:
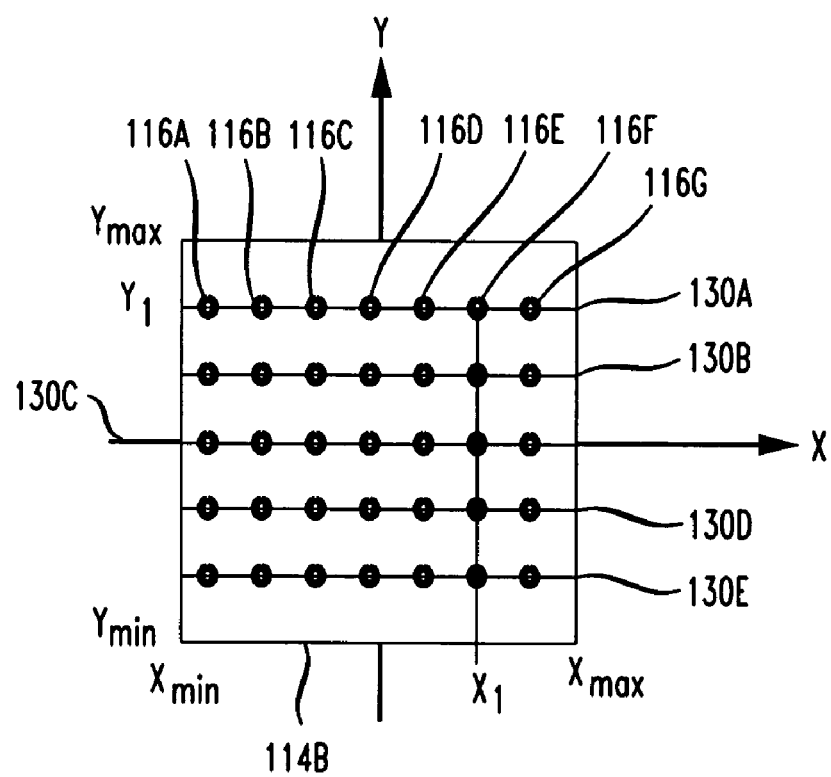
FIG. 1C shows a region of a retina over which an optical probe is rastered.
Figure 1D:
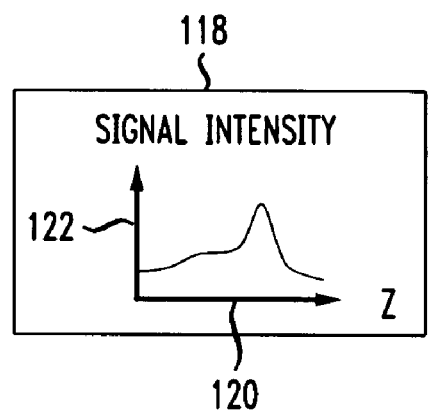
FIG. 1D shows an example of an OCT-A scan.
Figure 2:
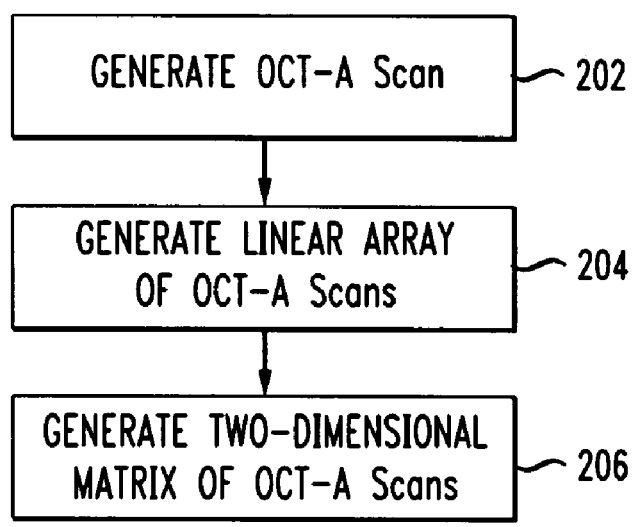
FIG. 2 is a flowchart for generating a 3-D OCT scan.

FIG. 2 is a flowchart of a process for generating a 3-D OCT scan over a region of a retina. In FIG. 1A, the region of the retina over which the scan is taken is represented by region 114A (shown as a rectangle) in the fundus image 104A. FIG. 1C shows an enlarged view of region 114A. In FIG. 1C, region 114B corresponds to region 114A. The coordinate system in region 114B is the (X,Y,Z) coordinate system of the 3-D OCT scan. In step 202, an optical probe is aimed along the Z-axis onto a point on the retinal surface. In the example shown in FIG. 1C, the sample point is point 116F, with coordinates $(X_1,Y_1)$. The signal intensity is measured as a function of the depth Z. This measurement is referred to as a one-dimensional (1-D) OCT-A scan, shown schematically in FIG. 1D as plot 118. The horizontal axis 120 represents the depth Z of a point $(X_1,Y_1,Z)$. The vertical axis 122 represents the signal intensity. The term "scan" in "OCT-A scan" refers to a scan along the Z-axis at points with constant lateral coordinates (X,Y).

Figure 7A:
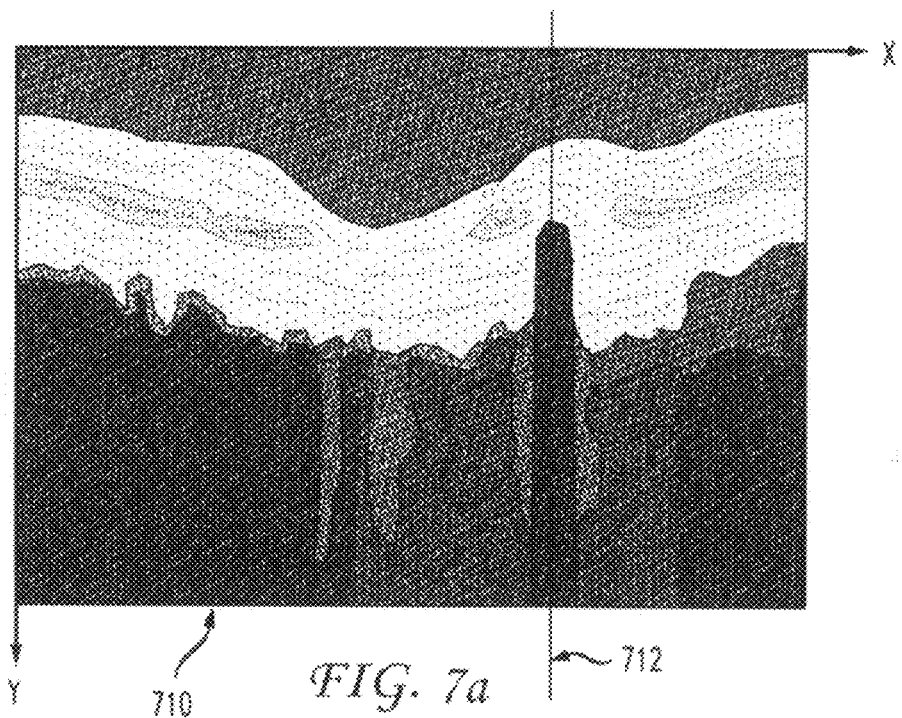
FIG. 7A shows an example of an OCT-B scan.
Figure 7B:
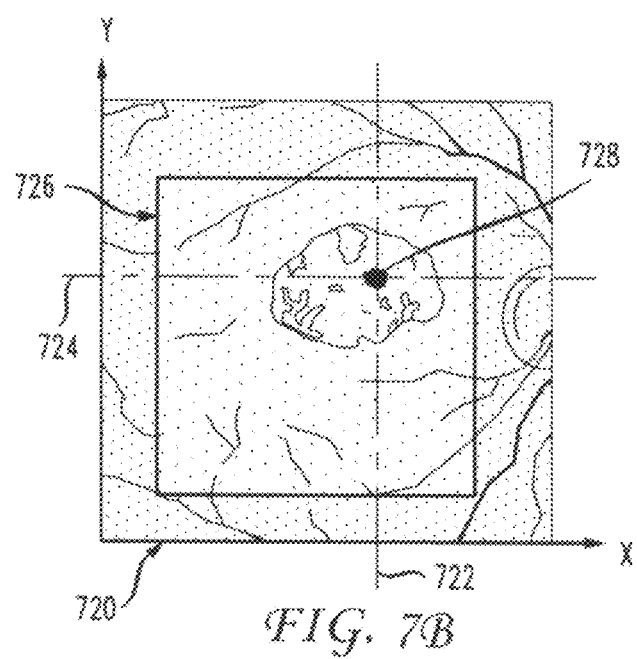
FIG. 7B shows an example of a fundus image and a 2-D composite image.
Figure 7C:
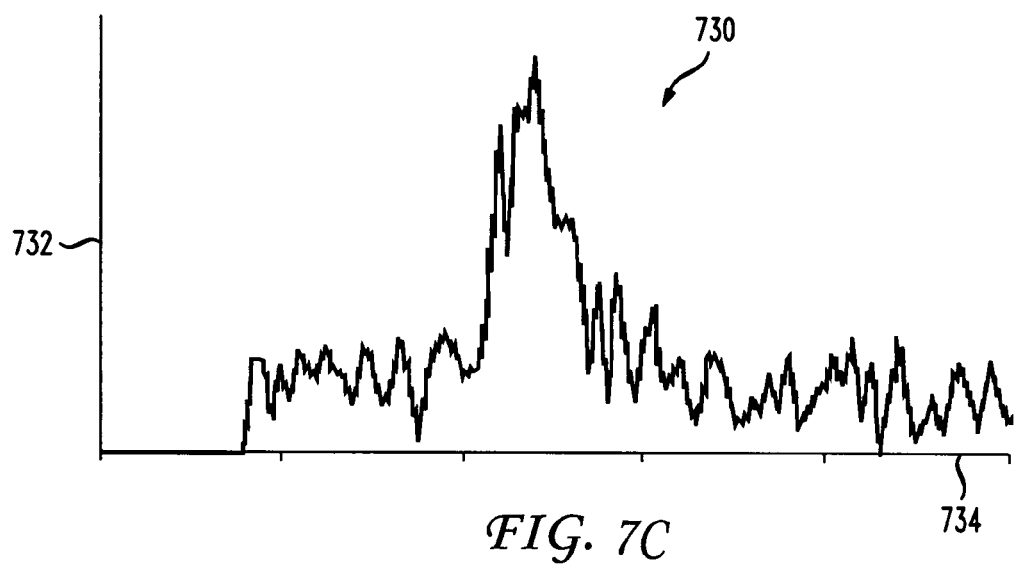
FIG. 7C shows an example of an OCT-A scan.

An example of an actual OCT-A scan is shown in FIG. 7C. Herein, "actual" refers to data collected from a patient. FIG. 7B shows a fundus image 720. Region 726 is a region in a 3-D OCT scan corresponding to the region in the fundus image 720 over which a 3-D OCT scan is taken. The intersection of reference lines 724 and 722 marks the (X,Y) coordinates of the point at which an OCT-A scan is taken. In this example, the point lies within a characteristic feature 728 (shown as a dark spot in FIG. 7B), which may be a lesion. The data from the OCT-A scan is shown in plot 730 in FIG. 7C. The vertical axis 732 represents the signal intensity, and the horizontal axis 734 represents the depth Z of a point in the retina.

Figure 1E:
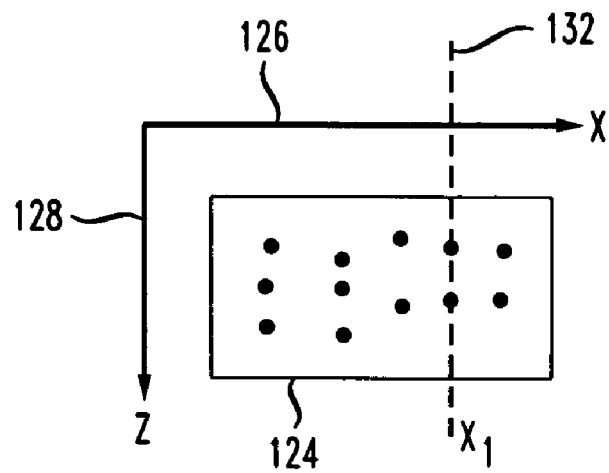
FIG. 1E shows an example of an OCT-B scan.

In step 204, multiple OCT-A scans, as shown in FIG. 1C, are taken at points 116A-116G along the line $Y=Y_1$ 130A, over the range of a linear scan from $X=X_{min}$ to $X=X_{max}$. This set of OCT-A scans, referred to as an OCT-B scan, yields the signal intensities from a 2-D matrix of points lying in a cross-sectional plane perpendicular to the plane of the retina. In FIG. 1E, the cross-sectional plane is the X-Z plane at $Y=Y_1$. FIG. 1E shows a graphical representation of cross-sectional image 124 of the data generated from the OCT-B scan. The horizontal axis 126 represents the X coordinate of a point in the OCT-B scan. The vertical axis 128 represents the depth Z of a point in the OCT-B scan. The array of dots represents pixels corresponding to the points at which the OCT-B scan was taken. The reference line 132 marks the $X_1$ coordinate of the point at which the OCT-A scan shown in FIG. 1D was taken.

A graphical representation of data from an actual OCT-B scan is shown in FIG. 7A. The X-Z plane of the cross-sectional image 710 is perpendicular to the X-Y plane of the fundus image 720 in FIG. 7B. The X-Z plane of the cross-sectional image 710 intersects the X-Y plane of the fundus image 720 in FIG. 7A along the reference line 724. The pixels in cross-sectional image 710 correspond to points in the retina at which the OCT-B scan was taken. The signal intensity at a point is represented by the luminance of the corresponding pixel in cross-sectional image 710. Reference line 712 is the line along which the OCT-A scan shown in plot 730 in FIG. 7C was taken.

Figure 4B:
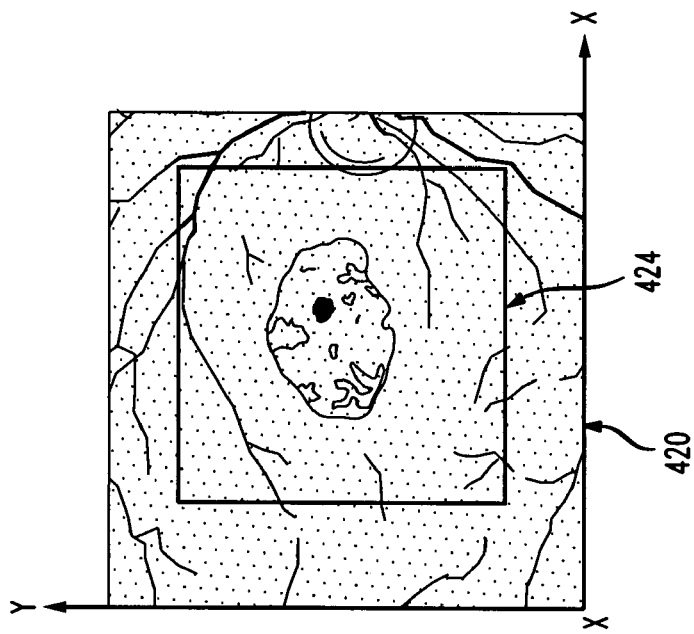
FIG. 4B shows an example of a fundus image and a 2-D composite image.
Figure 4A:
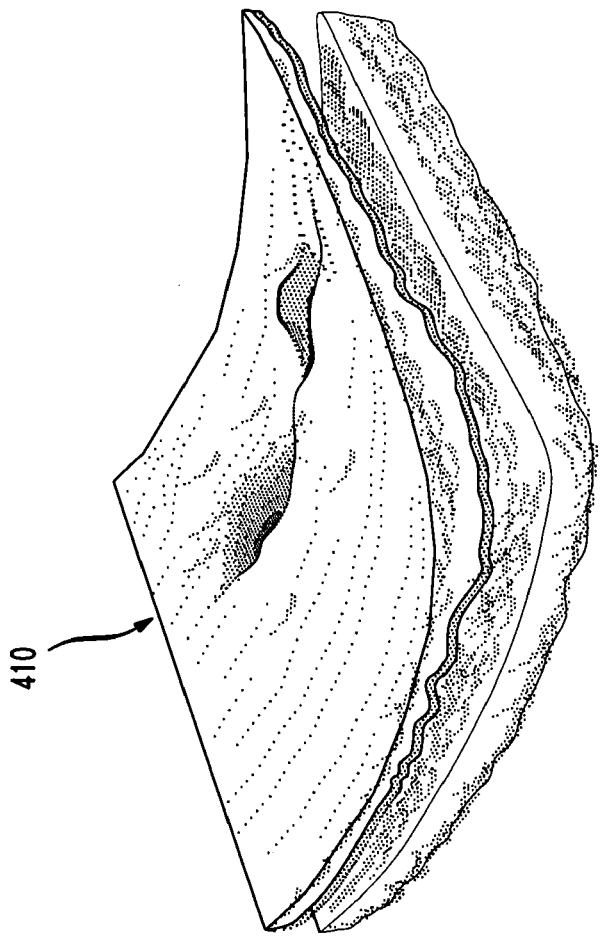
FIG. 4A shows an example of a 3-D graphical representation of data from a 3-D OCT scan.

Referring back to region 1148 in FIG. 1C, in step 206, multiple linear scans 130A-130E are taken over the range from $Y=Y_{min}$ to $Y=Y_{max}$. The resulting measurements are the data values of the 3-D OCT scan. An example of a 3-D graphical representation of an actual 3-D OCT scan is shown in graphical representation 410 in FIG. 4A. A voxel in graphical representation 410 corresponds to a point in the retina at which a 3-D OCT measurement was taken. The 3-D OCT scan was taken over the region 424, shown as a rectangle, within fundus image 420 in FIG. 4B. The luminance of a voxel is proportional to the signal intensity at the corresponding point.

In one embodiment of the invention, voxel data from a 3-D OCT scan and pixel data from a secondary 2-D image, such as a fundus image are spatially mapped by first generating a 2-D composite image from the voxel data. Details are discussed below in relation to the flowchart in FIG. 3. First, the terms "2-D composite image," "secondary 2-D image," and "spatially mapping" are specified here.

For a specific set of 3-D OCT data, herein, a "2-D composite image" refers to a 2-D image generated from the same specific set of 3-D OCT data. Examples of 2-D composite images are described below. Herein, a "secondary 2-D image" refers to any 2-D image which is not generated from the same specific set of 3-D OCT data. Examples of secondary 2-D images include a fundus image, a fluorescein angiogram, and an indocyanine green chorioangiogram. Secondary 2-D images may also comprise 2-D images generated from other 3-D OCT scans. Secondary 2-D images may be generated either on the same instrument as the one that generated the specific 3-D OCT scan, or on a different instrument. Secondary 2-D images may be generated either by digitizing a film image, or directly by a digital imaging system.

For a specific set of 3-D OCT data, a secondary 2-D image may be generated from a different set of 3-D OCT data, taken on the same instrument, of the same subject at a different time. For example, a 2-D composite image generated from a previous scan may serve as a secondary 2-D image for a current set of 3-D OCT data. Similarly, a 2-D composite image generated from a current set of 3-D OCT data may serve as a secondary 2-D image for an earlier set of 3-D OCT data. For example, a series of scans may be taken at different times of the same subject to determine whether a lesion is growing.

An exemplary process for generating a 2-D composite image is described here. In one embodiment of the invention, a 2-D composite image may be a 2-D representation of a set of 3-D data, wherein characteristic features in the 2-D representation may be compared with characteristic features in a 2-D secondary image. These characteristic features may then be used to spatially map the set of 3-D OCT data to a secondary 2-D image. In one embodiment of a 2-D composite image, a 2-D composite image may comprise pixels generated by "projecting" a 3-D matrix of voxels onto a 2-D plane parallel to the plane of the retina.

In the X-Y-Z coordinate system of a 3-D OCT scan, the volume of the 3-D OCT scan is defined by the set of discrete points P[i,j,k] in the retina at which the signal intensity is measured:

$$P[i,j,k]=\{X_i,Y_j,Z_k\}, \text{where } i_{min} \leq i \leq i_{max}, j_{min} \leq j \leq j_{max},$$
$$\text{and } k_{min} \leq k \leq k_{max}.$$

The voxels in a graphical representation of the 3-D OCT data correspond to these points.

A 2-D composite image is generated from the 3-D OCT data as follows. The following notation is used here:

$O[i,j,k]$=3-D OCT signal intensity at $P[i,j,k]$, and $C[i,j]$=Signal intensity at $(X_i,Y_j)$ of a 2-D composite image generated from a 3-D OCT scan.

The luminance of a voxel at $P[i,j,k]$ is a function of $O[i,j,k]$. The luminance of a pixel in the 2-D composite image at $P[i,j,0]$ is a function of $C[i,j]$.

The general functional dependence of $C[i,j]$ on $O[i,j,k]$ is denoted:

$$C[i,j]=f\{O[i,j,k]\}.$$

In one embodiment for generating a 2-D composite image, the 2-D composite image signal intensity is calculated as a weighted longitudinal sum of the 3-D OCT signal intensities at a lateral position $(X_i, Y_j)$:

$$C[i, j] = \sum_{k=kmin}^{k=kmax} \alpha(i, j, k) O[i, j, k], \text{ where}$$

$\alpha(i, j, k)$ are weight coefficients.

If $\alpha(i,j,k)=1$ over the full range $k_{min} \leq k \leq k_{max}$, the resulting 2-D composite image is referred to as a "projection image".

If $\alpha(i,j,k)=1$ for $k_L \leq k \leq k_U$ and $\alpha(i,j,k)=0$ otherwise;

where $k_L$=lower bound, $k_U$=upper bound, and the partial range $k_L \leq k \leq k_U$ is less than the full range $k_{min} \leq k \leq k_{max}$,
the resulting 2-D composite image is referred to as a "partial composite image." By varying the thickness and the depth of a partial composite image, the longitudinal properties of a feature in the retina may be probed. A 2-D composite image may be displayed as a monochrome image in which the luminance of a pixel is proportional to C[i,j]. The monochrome image may be displayed on various media, such as a monitor or photograph or print. The 2-D composite image may also be displayed as a false-color image.

Figure 5:
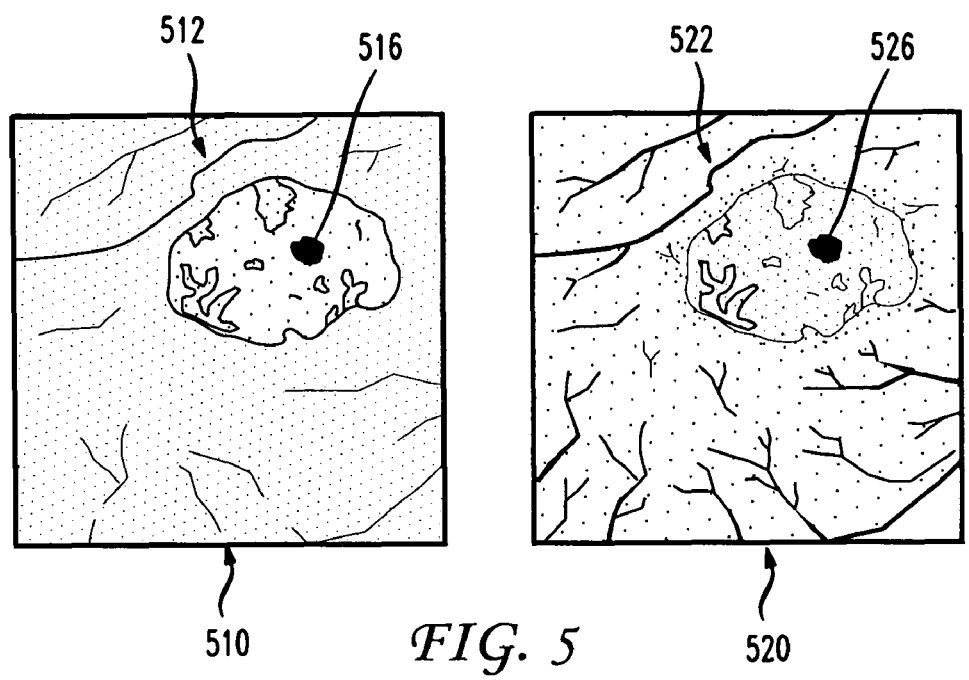
FIG. 5 shows examples of a projection image and a partial 2-D composite image.

FIG. 5 shows two examples of actual composite images. Image 510 is a projection image summed over a layer thickness of 480 voxels. Image 520 is a partial composite image of a 20-voxel thick layer within the retina. Characteristic feature 512 in image 510, which corresponds to characteristic feature 522 in image 520, is a blood vessel. Similarly, characteristic feature 516 in image 510, which corresponds to characteristic feature 526 in image 520, is a structure that is possibly a lesion.

One skilled in the art may develop other embodiments for generating a 2-D composite image.

Herein, "voxel data associated with a 3-D OCT scan" refers to data associated with a graphical representation of 3-D OCT data, wherein the voxels correspond to the points within the retina at which the 3-D OCT measurements are taken, and wherein the luminance of a voxel is proportional to the signal intensity. Herein, "pixel data associated with a secondary 2-D image" refers to data associated with a 2-D graphical image, wherein the pixels correspond to the points in the retina at which measurements are taken, and wherein the luminance of a pixel is proportional to the measured data value. In a fundus image, for example, the luminance of a pixel is proportional to the optical reflectivity at the corresponding point on the surface of the retina. (Strictly, the luminance of a pixel in a fundus image is proportional to the effective optical reflectivity of an array of points in the region of the pixel, since light penetrates the surface of the retina.)

A 2-D image of a retina, such as a fundus image or a 2-D composite image, in general will show characteristic features such as blood vessels, lesions, or other markings. These characteristic features are referred to herein as spatial indicia. Herein, the term to "spatially map" is used to indicate generally that at least one spatial indicium in one representation is located within a corresponding region of a second representation. Fundus images, 3D-OCT scans, and 2-D composite images are all examples of "representations." Herein, "spatially mapping voxel data associated with a 3-D OCT scan and pixel data associated with a secondary 2-D image" refers to spatially mapping data chosen from the combined set of {voxel data associated with a 3-D OCT scan and pixel data associated with a secondary 2-D image}. Voxel data associated with a 3-D OCT scan, for example, may be spatially mapped to pixel data associated with a secondary 2-D image. Pixel data associated with a secondary 2-D image, for example, may be spatially mapped to a subset of voxel data associated with a 3-D OCT scan. Examples of subsets of voxel data associated with a 3-D OCT scan include a 2-D composite image, an OCT-B scan, and an OCT-A scan. Furthermore, one subset of voxel data may be spatially mapped to a second subset of voxel data. For example, an OCT-A scan may be spatially mapped to an OCT-B scan.

Figure 8:
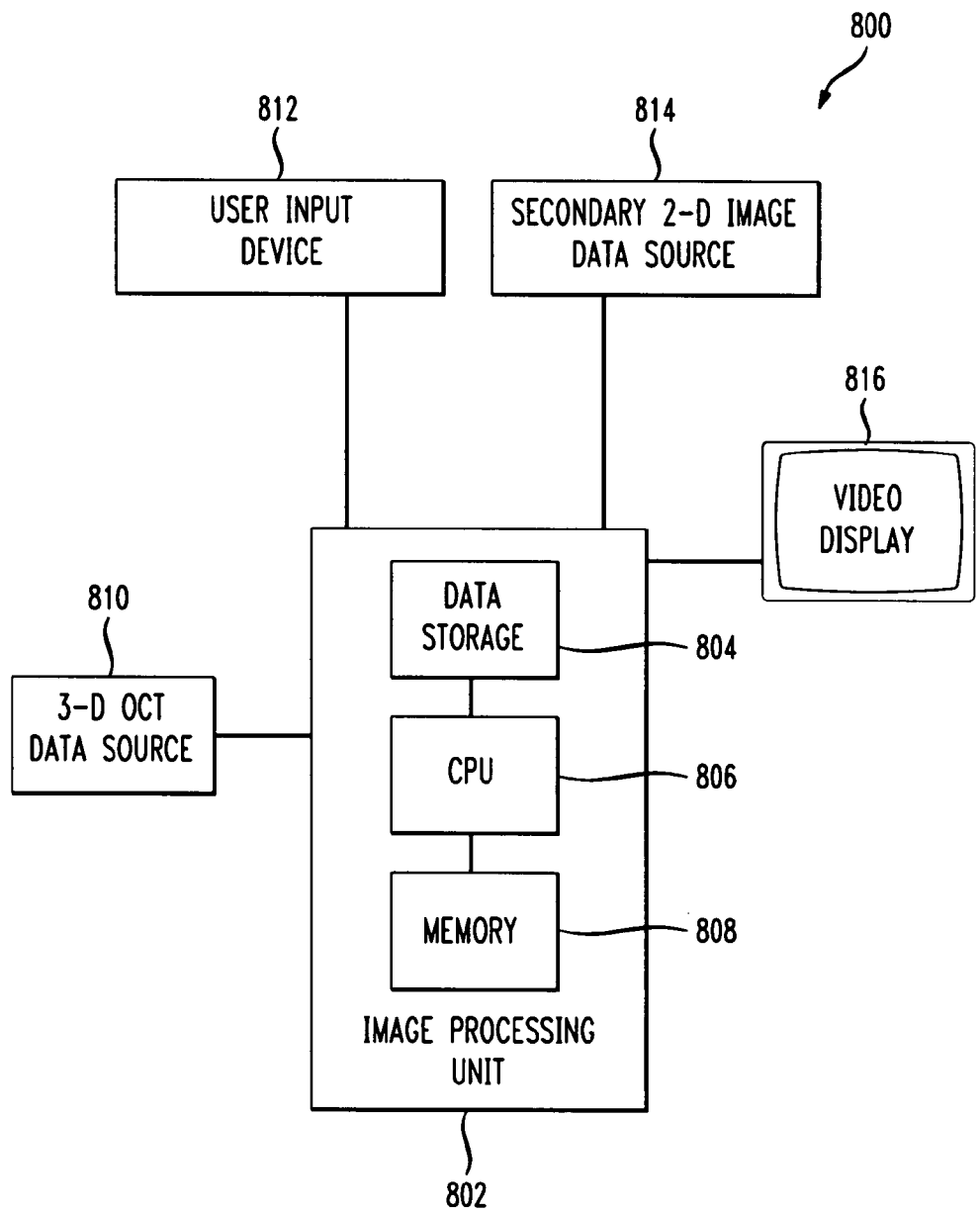
FIG. 8 shows an embodiment of an image processing system.

In one embodiment of the invention, voxel data associated with a 3-D OCT scan and pixel data associated with a secondary 2-D image may be stored and processed in an image processing system. An exemplary image processing system 800 is shown in FIG. 8. An image processing unit 802 may comprise a central processing unit (CPU) 806, memory 808, and data storage 804. Data storage 804 may, for example, be a hard drive. A 3-D OCT data source 810 may provide an input of 3-D OCT data to image processing unit 802. A secondary 2-D image data source 814 may provide an input of data from a secondary 2-D image to image processing unit 802. Video display 816, which, for example, may be a computer monitor, may be connected to image processing unit 802. A user input device 812 may be connected to image processing unit 802. User input device 812, which, for example, may be a mouse or keyboard, may generate control signals to image processing unit 802 upon actuation by a user. User input device 812 may have a position indicator to move a cursor on video display 816.

Figure 3:
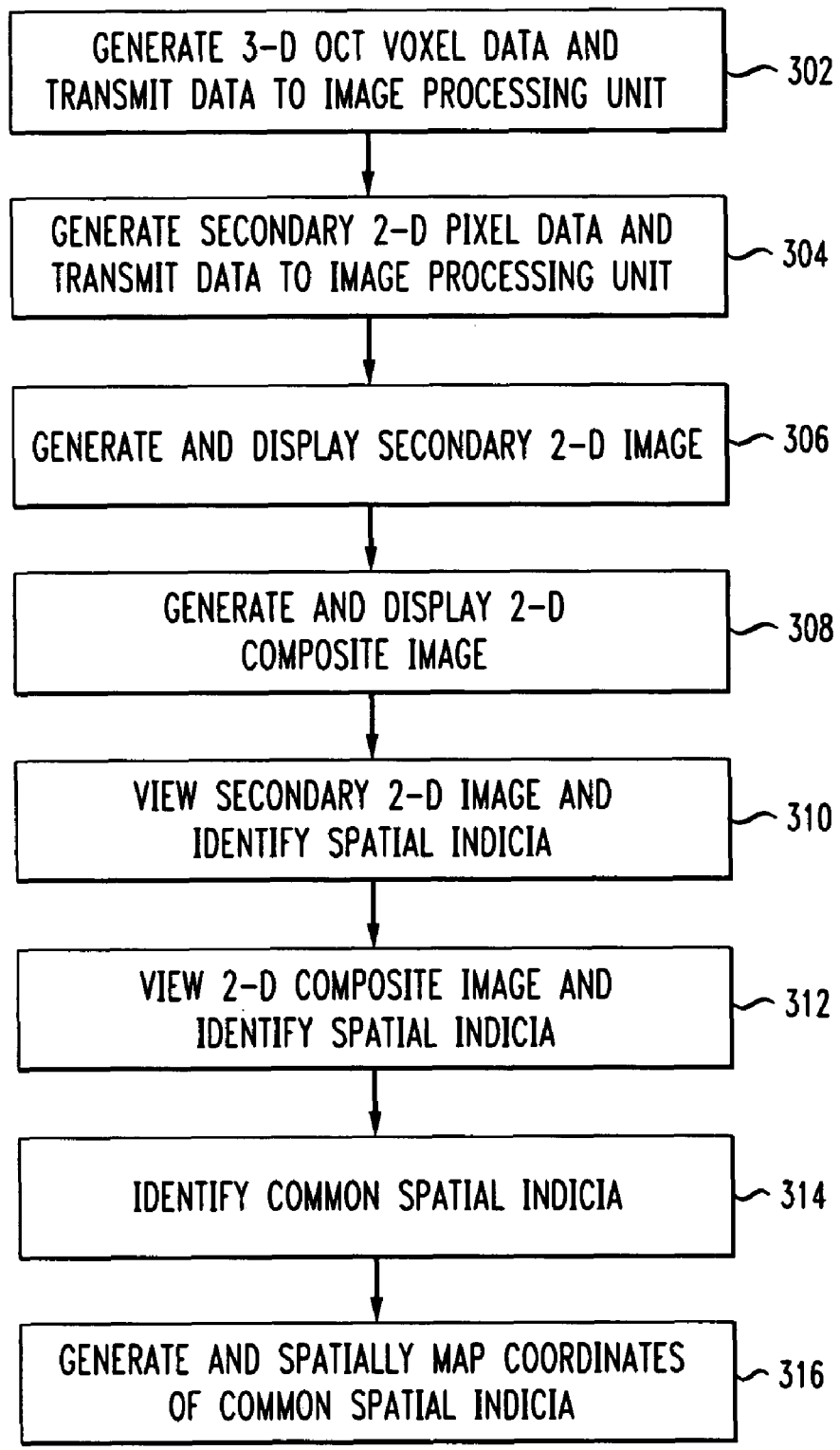
FIG. 3 is a flowchart for spatially mapping data from a 3-D OCT scan to a 2-D image.

FIG. 3 is a flowchart of an exemplary process for spatially mapping voxel data associated with a 3-D OCT scan and pixel data associated with a secondary 2-D image. In step 302, a set of voxel data is generated by 3-D OCT data source 810 and transmitted to image processing unit 802. In step 304, a set of pixel data is generated by secondary 2-D image data source 814 and transmitted to image processing unit 802. In step 306, image processing unit 802 generates a secondary 2-D image from the set of pixel data, and displays the secondary 2-D image on video display 816. In step 308, image processing unit 802 generates a 2-D composite image from the set of voxel data, and displays the 2-D composite image on video display 816.

In step 310, a user views the secondary 2-D image and identifies spatial indicia in the secondary 2-D image. In step 312, the user views the 2-D composite image and identifies spatial indicia in the 2-D composite image. Some spatial indicia will be present in only the secondary 2-D image. Some spatial indicia will be present in only the 2-D composite image. Some spatial indicia will be present in both the secondary 2-D image and in the 2-D composite image. Spatial indicia which are present in both images are referred to herein as "common spatial indicia." Common spatial indicia, as represented in a secondary 2-D image, "correspond" to common spatial indicia, as represented in a 2-D composite image. In step 314, the user compares spatial indicia in the 2-D composite image with spatial indicia in the secondary 2-D image and identifies the common spatial indicia. In one example, a distinctive lesion may be found in both the 2-D composite image and the secondary 2-D image. In a second example, a distinctive network of blood vessels may be found in both the 2-D composite image and the secondary 2-D image.

In step 316, the coordinates of the common spatial indicia in the 2-D composite image and in the secondary 2-D image are generated and spatially mapped. Embodiments for generating and spatially mapping the coordinates are discussed below. Spatial indicia may be characterized by a single point, or by multiple points. A small circular feature, for example, may be characterized by coordinates of its center. A more extended, irregular feature, for example, may be characterized by the coordinates of multiple points residing on the border of the feature.

In one embodiment for generating and spatially mapping the coordinates of common spatial indicia, the composite 2-D image is superimposed onto the secondary 2-D image. The secondary 2-D image, for example, may be held stationary on the video display 816, while the 2-D composite image may be manipulated (rotated, scaled, and moved) on the video display 816. The manipulations may be performed with a mouse, for example. The user views the two images and manipulates the 2-D composite image until one or more common spatial indicia are superimposed onto the corresponding spatial indicia in the secondary 2-D image. A mouse, for example, may be used to drag the 2-D composite image on top of the secondary 2-D image. The image processing system analyzes the images to generate coordinates of the spatial indicia in the 2-D composite image and in the fundus image. The image processing system spatially maps the coordinates of the spatial indicia in the 2-D composite image to the coordinates of the corresponding spatial indicia in the fundus image. In the region which is common to the 2-D composite image and the fundus image, the image processing system maps all points in the 2-D composite image to corresponding points in the secondary 2-D image.

Figure 6B:
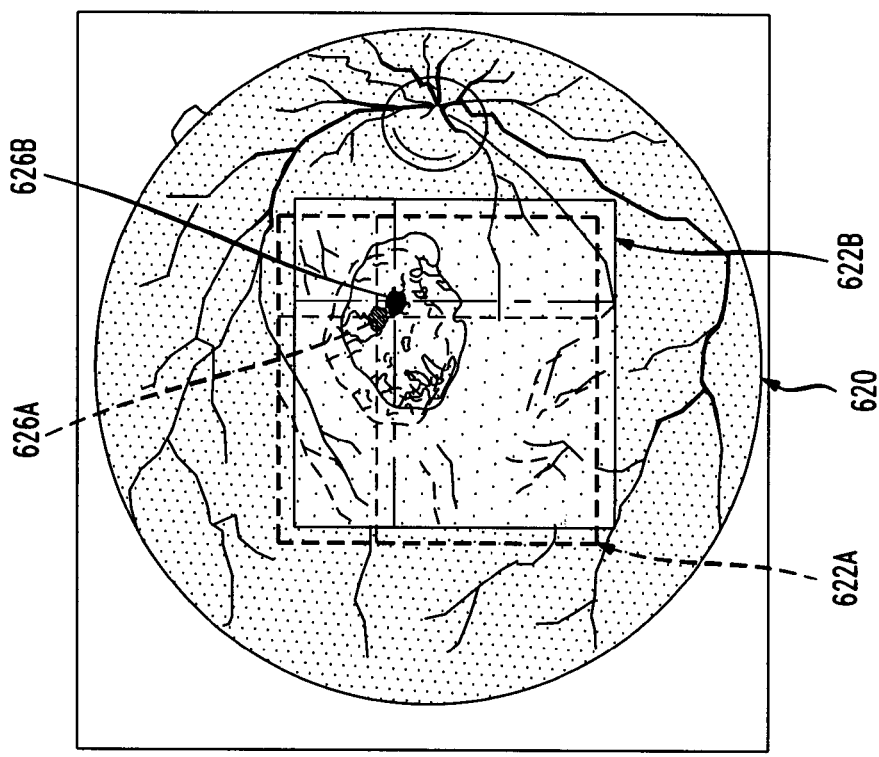
FIG. 6B shows an example of a 2-D composite image and a fundus image in which spatial indicia are not superimposed.
Figure 6A:
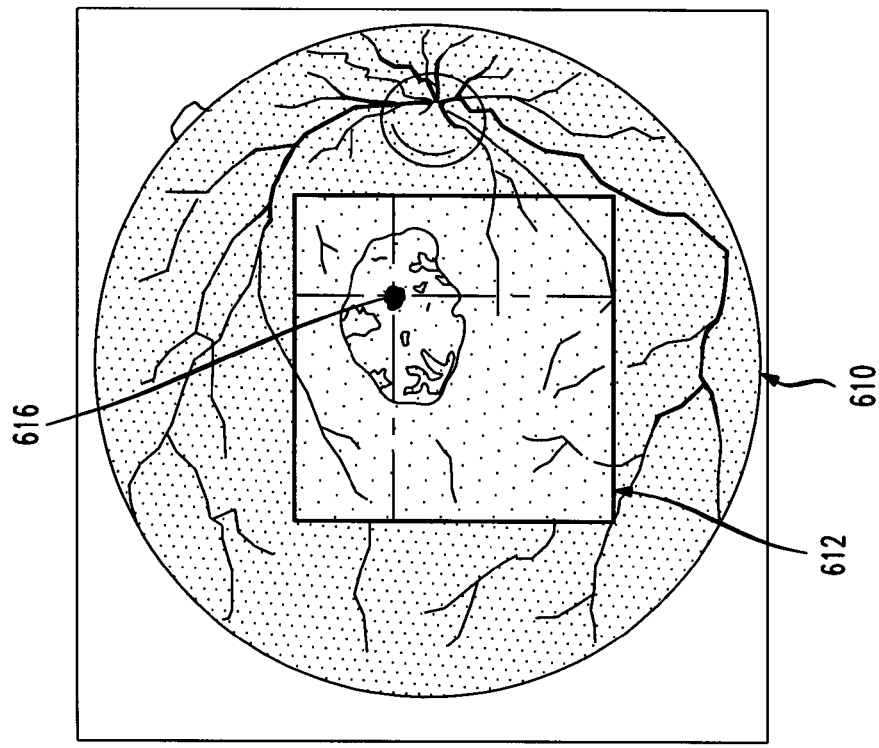
FIG. 6A shows an example of a 2-D composite image and a fundus image in which spatial indicia are superimposed.

FIGS. 6A and 6B show actual images of a 2-D composite image before and after it has been superimposed on a fundus image. FIG. 6B shows the images prior to superposition of common spatial indicia. In FIG. 6B, image 620, shown within the region bounded by the circular border, is a fundus image. Image 622A, shown within the rectangular region bounded by the dashed border, is a 2-D composite image prior to visual registration with the fundus image. Image 622B, shown within the rectangular region bounded by the solid border, is the region of the fundus image corresponding to composite image 622A. Feature 626A in the 2-D composite image and corresponding feature 626B in the fundus image are used as spatial indicia to map the 2-D composite image to the fundus image. A user manipulates image 622A to superimpose feature 626A on feature 626B. FIG. 6A shows the final results. Image 610, shown within the region bounded by the circular border, corresponds to the fundus image 620 in FIG. 6B. Feature 616 is the superposition of features 626A and 626B in FIG. 6B. Image 612 (shown within the region bounded by the solid rectangular border) shows the region in which the 2-D composite image is spatially mapped to fundus image 610.

In another embodiment for generating and spatially mapping the coordinates, the composite 2-D image and the secondary 2-D images are kept separated and held stationary on the video display 816. The user operates a user input device 812 to position a cursor over a common spatial indicium in the 2-D composite image, and actuates the user input device 812 to enter the $(X_i,Y_j)$ coordinates of the common spatial indicium in the 2-D composite image into the image processing unit 802. The user then positions the cursor over the corresponding common spatial indicium in the secondary 2-D image, and enters the $(x_i,y_j)$ coordinates of the common spatial indicium in the secondary 2-D image into the image processing unit 802. For example, a user may move a mouse to position a cursor over a spatial indicium and then enters the coordinates by clicking the mouse. The image processing system spatially maps the coordinates of the spatial indicia in the 2-D composite image to the coordinates of the corresponding spatial indicia in the fundus image. In the region which is common to the 2-D composite image and the secondary 2-D image, the image processing system maps all points in the 2-D composite image to corresponding points in the secondary 2-D image.

An embodiment of a process for spatially mapping the set of coordinates $(X_i,Y_j)$ to the set of coordinates $(x_i,y_j)$ is described here. The following notation is used:

$S_n=\{X_i,Y_j\}$ is the set of coordinates of spatial indicia, common to both the 2-D composite image and the secondary 2-D image, in the X-Y composite image plane, and $s_n=\{x_i,y_j\}$ is the set of coordinates of corresponding spatial indicia in the x-y secondary 2-D image plane.

The index n runs from n=1 to n=N, where N is the number of points on spatial indicia common to both the 2-D composite image and the secondary 2-D image.

Spatially mapping involves a one-to-one correspondence between a point in $S_n$ and a point in $s_n$, for all points in $S_n$ and all points in $s_n$. Once the one-to-one correspondence between coordinates of spatial indicia in the two images has been established, one skilled in the art may establish a one-to-one correspondence between coordinates of all points in regions common to both the 2-D composite image and the secondary 2-D image. After the 2-D composite image has been spatially mapped to the secondary 2-D image, values of 3-D OCT data $O[i,j,k]$ may be spatially mapped to the secondary 2-D image.

In another embodiment for generating and spatially mapping the coordinates, the 3-D OCT data and secondary 2-D image data may be transmitted to the image processing unit 802, which uses an automated image recognition process to spatially map a 2-D composite image to a secondary 2-D image. In the region which is common to the 2-D composite image and the secondary 2-D image, the image processing system maps all points in the 2-D composite image to corresponding points in the secondary 2-D image.

One skilled in the art may develop other methods for mapping a 2-D composite image to a secondary 2-D image.

Once the 2-D composite image has been spatially mapped to the secondary 2-D image, values of 3-D OCT data within the region that has been spatially mapped may then be analyzed. Graphical representations of the set or subsets of the 3-D OCT data may be cross-correlated with positions in the secondary 2-D image. Subsets of the 3-D OCT data may include, for example, OCT-A scans, OCT-B scans, and 2-D composite images. In one embodiment of the invention, the 3-D OCT data and secondary 2-D image are processed by image processing system 800, shown in FIG. 8. A user operates user input device 808 to position a cursor over a position in a secondary 2-D image displayed on the video display 816. The corresponding set or subsets of 3-D OCT data may be displayed by actuating the user input device 812 to transmit control signals to the image processing system. In another embodiment of the invention, the user input device 812 may be a keyboard. A user operates the keyboard to enter the coordinates of a position directly into the image processing unit, and to issue commands to generate control signals.

Similarly, a cursor may be positioned over a display corresponding to a 3-D OCT scan, an OCT-A scan, an OCT-B scan, a 2-D composite image, or other graphical representations of subsets of the 3-D OCT data, and the corresponding secondary 2-D image may be displayed by actuating the user input device 812 to transmit control signals to the image processing system. A graphical representation of one subset of 3-D OCT data may also be cross-correlated with a second subset. For example, a cursor may be positioned over a display corresponding to an OCT-B scan, and the corresponding OCT-A scan may be displayed by actuating the user input device 812 to transmit control signals to the image processing system. Again, the user may also use a keyboard to enter the coordinates directly into the image processing unit, and to issue commands to generate control signals.

Examples of cross-correlated graphical representations of voxel data from an actual 3-D OCT scan and pixel data from an actual fundus image are given below.

FIG. 7B shows a fundus image 720. Region 726 is a region in a 3-D OCT scan corresponding to the region in the fundus image 720 over which a 3-D OCT scan is taken. The image within region 726 is a 2-D composite image generated from the 3-D OCT scan. The 2-D composite image is superimposed on top of the underlying fundus image. The intersection of reference lines 722 and 724 marks the (X,Y) lateral coordinates of a pixel in the 2-D composite image. In one embodiment of the invention, the (X,Y) coordinates are entered into an image processing system. The image processing system generates the corresponding 1-D OCT-A scan 730 at that position. The vertical axis 732 represents the signal intensity, and the horizontal axis 734 represents the depth perpendicular to the surface of the retina.

The image processing system may also generate a 2-D OCT-B scan cross-section corresponding to the (X,Y) coordinate. In one embodiment of the invention, the (X,Y) coordinates are entered into an image processing system. The image processing system generates the corresponding OCT-B scan cross-sectional image 710 in FIG. 7A. The X-Z plane of the cross-sectional image 710 is perpendicular to the X-Y plane of the fundus image 720 in FIG. 7B. The X-Z plane of the cross-sectional image 710 intersects the X-Y plane of the fundus image 720 along the reference line 724. The pixels in cross-sectional image 710 correspond to points in the retina at which the OCT-B scan was taken. The signal intensity at a point is represented by the luminance of the corresponding pixel in cross-sectional image 710. Reference line 712 in FIG. 7A indicates the X coordinate in the OCT-B scan cross-sectional image 710 corresponding to the X coordinate of reference line 722 in the 2-D composite image within region 726 shown in FIG. 7B. Reference line 712 is also the line along which the OCT-A scan shown in plot 730 in FIG. 7C was taken.

The operation may also operate in the reverse direction. If the (X,Y) coordinates of reference line 712 in FIG. 7A are entered into the image processing system, the corresponding 2-D composite image within region 726 and the corresponding fundus image 720 in FIG. 7B may be generated.

Although the embodiments of the invention described herein are examples of spatially mapping voxel data associated with 3-D OCT measurements of a retina and pixel data associated with a fundus image, one skilled in the art may apply embodiments of the invention to other applications in which voxel data associated with a 3-D OCT measurement and pixel data associated with a 2-D image are spatially mapped. Applications, for example, may include other biologic applications such as dermatology and cardiology. Applications, for example, may include non-biologic applications such as industrial process monitoring.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for spatially mapping three-dimensional (3-D) voxel data associated with a three-dimensional optical coherence tomography (3-D OCT) scan and pixel data associated with a secondary two-dimensional (2-D) image, comprising:
    generating a 2-D composite image from said 3-D voxel data, wherein said 2-D composite image is different from said secondary 2-D image; and
    spatially mapping said 2-D composite image and said secondary 2-D image.

2. The method of claim 1, wherein said step of spatially mapping said 2-D composite image and said secondary 2-D image comprises:
    displaying said 2-D composite image;
    displaying said secondary 2-D image; and
    receiving user input to identify at least one common spatial indicium as represented in said display of said secondary 2-D image and a corresponding common spatial indicium as represented in said display of said 2-D composite image.

3. The method of claim 2, wherein said step of receiving user input comprises:
    receiving coordinates of said at least one common spatial indicium as represented in said display of said secondary 2-D image; and
    receiving coordinates of said corresponding common spatial indicium as represented in said display of said 2-D composite image.

4. The method of claim 1, wherein said step of spatially mapping said 2-D composite image and said secondary 2-D image comprises:
    displaying said 2-D composite image;
    displaying said secondary 2-D image; and
    receiving user input to superimpose said secondary 2-D image and said 2-D composite image.

5. The method of claim 4, wherein said step of receiving user input to superimpose said secondary 2-D composite image and said 2-D composite image comprises:
    receiving user input to superimpose at least one common spatial indicium as represented in said display of said secondary 2-D image and a corresponding common spatial indicium as represented in said display of said 2-D composite image.

6. The method of claim 1, wherein said step of spatially mapping said 2-D composite image and said secondary 2-D image is performed using an automated image recognition process.

7. The method of claim 1, wherein said 3-D voxel data comprises one of a plurality of OCT-A scans or a plurality of OCT-B scans.

8. The method of claim 1, wherein said 2-D composite image is a first 2-D composite image, and wherein said secondary 2-D image comprises one of an opthalmic image, a fundus image, a fluorescein angiogram, an indocyanine green angiogram, or a second 2-D composite image.

9. The method of claim 1, further comprising:
    displaying at least two of a graphical representation of said 3-D voxel data, said secondary 2-D image, an OCT-A plot, an OCT-B cross-sectional image, and said 2-D composite image;

receiving user input to identify a position in one of said displayed graphical representation of 3-D voxel data, secondary 2-D image, OCT-A plot, OCT-B cross-sectional image, and 2-D composite image;

calculating a corresponding position in at least one other of said graphical representation of 3-D voxel data, secondary 2-D image, OCT-A plot, OCT-B cross-sectional image, and 2-D composite image; and, displaying at least one other of said graphical representation of 3-D voxel data, secondary 2-D image, OCT-A plot, OCT-B cross-sectional image, and 2-D composite image based at least in part on said calculated corresponding position.

10. The method of claim 9, wherein said step of receiving user input comprises:

receiving coordinates of said position.

11. An image processing system for spatially mapping three-dimensional (3-D) voxel data associated with a three-dimensional optical coherence tomography (3-D OCT) scan and pixel data associated with a secondary two-dimensional (2-D) image, comprising:

means for generating a 2-D composite image from said 3-D voxel data, wherein said 2-D composite image is different from said secondary 2-D image; and means for spatially mapping said 2-D composite image and said secondary 2-D image.

12. The image processing system of claim 11, wherein said means for spatially mapping said 2-D composite image and said secondary 2-D image further comprises:

means for displaying said 2-D composite image;
means for displaying said secondary 2-D image; and
means for receiving user input to identify at least one common spatial indicium as represented in said display of said secondary 2-D image and a corresponding common spatial indicium as represented in said display of said 2-D composite image.

13. The image processing system of claim 12, wherein said means for receiving user input further comprises:

means for receiving coordinates of said at least one common spatial indicium as represented in said display of said secondary 2-D image; and means for receiving coordinates of said corresponding common spatial indicium as represented in said display of said 2-D composite image.

14. The image processing system of claim 11, wherein said means for spatially mapping said 2-D composite image and said secondary 2-D image further comprises:

means for displaying said 2-D composite image;
means for displaying said secondary 2-D image; and
means for receiving user input to superimpose said secondary 2-D image and said 2-D composite image.

15. The image processing system of claim 14, wherein said means for receiving user input to superimpose said secondary 2-D composite image and said 2-D composite image further comprises:

means for receiving user input to superimpose at least one common spatial indicium as represented in said display of said secondary 2-D image and a corresponding common spatial indicium as represented in said display of said 2-D composite image.

16. The image processing system of claim 11, wherein said means for spatially mapping said 2-D composite image and said secondary 2-D image further comprises:

means for automated image recognition processing.

17. The image processing system of claim 11, further comprising:

means for displaying at least two of a graphical representation of said 3-D voxel data, said secondary 2-D image, an OCT-A plot, an OCT-B cross-sectional image, and said 2-D composite image;

means for receiving user input to identify a position in one of said displayed graphical representation of 3-D voxel data, secondary 2-D image, OCT-A plot, OCT-B cross-sectional image, and 2-D composite image;

means for calculating a corresponding position in at least one other of said graphical representation of 3-D voxel data, secondary 2-D image, OCT-A plot, OCT-B cross-sectional image, and 2-D composite image; and, means for displaying at least one other of said graphical representation of 3-D voxel data, secondary 2-D image, OCT-A plot, OCT-B cross-sectional image, and 2-D composite image based at least in part on said calculated corresponding position.

18. The image processing system of claim 17, wherein said means for receiving user input comprises:

means for receiving coordinates of said position.

19. A non-transitory computer readable medium storing computer program instructions for spatially mapping three-dimensional (3-D) voxel data associated with a three-dimensional optical coherence tomography (3-D OCT) scan and pixel data associated with a secondary two-dimensional (2-D) image, the computer program instructions defining the steps of:

generating a 2-D composite image from said 3-D voxel data, wherein said 2-D composite image is different from said secondary 2-D image; and spatially mapping said 2-D composite image and said secondary 2-D image.

20. The non-transitory computer readable medium of claim 19 wherein said computer program instructions defining the step of spatially mapping said 2-D composite image and said secondary 2-D image further comprise computer program instructions defining the steps of:

displaying said 2-D composite image;
displaying said secondary 2-D image; and
receiving user input to identify at least one common spatial indicium as represented in said display of said secondary 2-D image and a corresponding common spatial indicium as represented in said display of said 2-D composite image.

21. The non-transitory computer readable medium of claim 20 wherein said computer program instructions defining the step of receiving user input further comprise computer program instructions defining the steps of:

receiving coordinates of said at least one common spatial indicium as represented in said display of said secondary 2-D image; and receiving coordinates of said corresponding common spatial indicium as represented in said display of said 2-D composite image.

22. The non-transitory computer readable medium of claim 19 wherein said computer program instructions defining said step of spatially mapping said 2-D composite image and said secondary 2-D image further comprise computer program instructions defining the steps of:

displaying said 2-D composite image;
displaying said secondary 2-D image; and
receiving user input to superimpose said secondary 2-D image and said 2-D composite image.

23. The non-transitory computer readable medium of claim 22, wherein said computer program instructions defining said step of receiving user input to superimpose said secondary 2-D composite image and said 2-D composite image further comprise computer program instructions defining the step of:

receiving user input to superimpose at least one common spatial indicium as represented in said display of said secondary 2-D image and a corresponding common spatial indicium as represented in said display of said 2-D composite image.

24. The non-transitory computer readable medium of claim 19, wherein said computer program instructions defining said step of spatially mapping said 2-D composite image and said secondary 2-D image further comprise computer program instructions defining the step of:

automated image recognition processing.

25. The non-transitory computer readable medium of claim 19 wherein said computer program instructions for spatially mapping three-dimensional (3-D) voxel data associated with a three-dimensional optical coherence tomography (3-D OCT) scan and pixel data associated with a secondary two-dimensional (2-D) image, further comprise computer program instructions defining the steps of:

displaying at least two of a graphical representation of said 3-D voxel data, said secondary 2-D image, an OCT-A plot, an OCT-B cross-sectional image, and said 2-D composite image;

receiving user input to identify a position in one of said displayed graphical representation of 3-D voxel data, secondary 2-D image, OCT-A plot, OCT-B cross-sectional image, and 2-D composite image;

calculating a corresponding position in at least one other of said graphical representation of 3-D voxel data, secondary 2-D image, OCT-A plot, OCT-B cross-sectional image, and 2-D composite image; and, displaying at least one other of said graphical representation of 3-D voxel data, secondary 2-D image, OCT-A plot, OCT-B cross-sectional image, and 2-D composite image based at least in part on said calculated corresponding position.

26. The non-transitory computer readable medium of claim 25, wherein said computer program instructions for receiving user input further comprise computer program instructions defining the step of:

receiving coordinates of said position.

* * * * *

UNITED STATES PATENT AND TRADEMARK OFFICE
CERTIFICATE OF CORRECTION

| | | |
|---|---|---|
| PATENT NO. | : 8,134,554 B1 | Page 1 of 1 |
| APPLICATION NO. | : 11/800186 | |
| DATED | : March 13, 2012 | |
| INVENTOR(S) | : Yijun Huang, Alexandre Kotchkin and Tetsuyoshi Royama | |

It is certified that error appears in the above-identified patent and that said Letters Patent is hereby corrected as shown below:

In the Specifications:

Column 5, line 59, "1148" should read --114B--

Signed and Sealed this
Seventeenth Day of July, 2012

David J. Kappos
*Director of the United States Patent and Trademark Office*